United States Patent

Yamazaki et al.

[11] Patent Number: 5,861,056
[45] Date of Patent: *Jan. 19, 1999

[54] WATER-BASED MAGENTA INK COMPOSITION AND INK-JET RECORDING PROCESS EMPLOYING THE SAME

[75] Inventors: Hideto Yamazaki; Masaya Fujioka; Takeo Kitahara; Masahito Kato, all of Nagoya; Shunichi Higashiyama, Yotsukaichi, all of Japan

[73] Assignee: Brother Kogyo Kabushiki Kaisha, Nagoya, Japan

[*] Notice: The term of this patent shall not extend beyond the expiration date of Pat. No. 5,853,468.

[21] Appl. No.: 746,627

[22] Filed: Nov. 12, 1996

[30] Foreign Application Priority Data

Nov. 13, 1995 [JP] Japan .................................. 7-319563

[51] Int. Cl.⁶ .................................................. C09D 11/02
[52] U.S. Cl. ..................................... 106/31.27; 106/31.43; 106/31.57
[58] Field of Search ................................ 106/31.27, 31.43, 106/31.57

[56] References Cited

U.S. PATENT DOCUMENTS

| | | | |
|---|---|---|---|
| 5,016,028 | 5/1991 | Temple | 346/140 R |
| 5,100,469 | 3/1992 | Pontes et al. | 106/31.36 |
| 5,356,464 | 10/1994 | Hickman et al. | 106/31.36 |
| 5,522,922 | 6/1996 | Furusawa et al. | 106/31.58 |
| 5,534,050 | 7/1996 | Gundlach | 106/31.58 |
| 5,637,140 | 6/1997 | Fujioka | 106/31.35 |

FOREIGN PATENT DOCUMENTS

| | | |
|---|---|---|
| A-64-6074 | 1/1989 | Japan . |
| A-1-204979 | 8/1989 | Japan . |
| A-2-150355 | 6/1990 | Japan . |

*Primary Examiner*—Helene Klemanski
*Attorney, Agent, or Firm*—Oliff & Berridge, PLC

[57] ABSTRACT

A water-based magenta ink composition comprising an aqueous medium, a magenta dye dissolved therein and a pH adjuster, where, as the magenta dye, Color Index Number Acid Red 52 is used; as the pH adjuster, a basic organic compound is used; and the pH of the water-based magenta composition is adjusted to a value within the range of from 8 to 10.

9 Claims, No Drawings

WATER-BASED MAGENTA INK COMPOSITION AND INK-JET RECORDING PROCESS EMPLOYING THE SAME

BACKGROUND OF THE INVENTION

1. Field of the Invention

This invention relates to a water-based magenta ink composition suited for ink-jet recording, and an ink-jet recording process making use of it.

2. Description of the Related Art

Ink-jet recording is a system in which ink droplets are formed by ink ejection methods of various types (e.g., a system utilizing electrostatic attraction, a system in which mechanical vibration or displacement is imparted to ink by the use of a piezoelectric device, and a system in which ink is heated to cause it to bubble and a pressure produced when it bubbles is utilized), and part or the whole of ink droplets is caused to adhere to recording mediums such as paper to make a record.

As ink compositions used in such ink-jet recording systems, pigment ink compositions or dye ink compositions prepared by dissolving or dispersing water-soluble dyes or pigments of various colors in water or mixed solvents of water and water-soluble organic solvents are known in the art.

Ink compositions for ink-jet recording are required to have various performances such that they cause no clogging at nozzles and in ink channels of the head of a recording apparatus, such that they cause no changes in properties and no deposition of solid matter during their storage, such that they give recorded images having sharp color tones and sufficiently high densities, such that they enable recording without limitation on the type of recording mediums, such that they have a high rate of fixing to recording mediums, such that they have excellent water resistance, weatherability, solvent resistance and abrasion resistance, such that they give recorded images having a good resolution, and such that they have values of physical properties such as viscosity and surface tension within proper ranges. In particular, what is important is the liquid stability that the ink does not cause clogging of, and deposits at, nozzles and ink channels of the recording apparatus.

Pigment ink compositions have a superior weatherability, but have a poor liquid stability since the pigment is dispersed in a solvent. During their storage for a long period of time, the dispersion of pigment may become unstable to cause agglomeration. Hence, they tend to cause clogging at the head nozzles or the like of the ink-jet recording apparatus. Accordingly, it is attempted to make improvement by regulating the constitution of pigment ink compositions as disclosed in Japanese Patent Application Laid-open No. 1-204979, or by controlling the pH of water-based pigment ink compositions as disclosed in Japanese Patent Application Laid-open No. 64-6074. They, however, can not well endure the use as ink-jet recording inks.

Dye ink compositions, though having weatherability inferior to the pigment ink compositions, do not tend to cause clogging at nozzles and in ink channels of the head of the recording apparatus, and are widely used as ink-jet recording inks.

Many of such dye ink compositions are available as water-based ink compositions prepared by dissolving water-soluble dyes having various chemical structures, in water or mixed solvents of water and water-soluble organic solvents. Such water-based dye ink compositions may cause a decrease in solubility of dyes to cause deposits of dyes, when the quality of liquid is nearly neutral or acidic. On the other hand, when strongly alkaline, they may cause deformation of members used in the ink-jet recording apparatus, in particular, members made of organic materials, or the organic materials constituting the members may dissolve into the ink, undesirably. They may also be harmful to human bodies, e.g., may attack the cornea, and hence, in order to adjust the pH of inks to the weakly alkaline side, some of them employ pH adjusters such as inorganic salts such as KOH and NaOH or inorganic salt components having a buffer action.

However, such water-based dye ink compositions containing inorganic salts tend to cause the inorganic salt components to deposit at the head nozzles of ink-jet printers, to cause clogging. When the ink compositions are used over a long period of time, the addition of the pH adjuster becomes less effective, so that the pH may become lower and the dye may become deposited to make the liquid stability poor.

Meanwhile, when full-color recorded images are reproduced using water-based dye ink compositions, four primary color inks, i.e., yellow ink, magenta ink, cyan ink and additionally black ink are used, and color tones of recorded images are determined by subtractive color mixing. In order to give recorded images having a sharp color tone as one of performances of the above inks, these inks are also required to form ideal primary colors of yellow, magenta, cyan and black whose hues each have no other color tint.

In order to form ideal hues, dyes must be selected. In particular, in the case of magenta ink, only few dyes can reproduce magenta color, and Color Index Number Acid Red 52 (hereinafter often "C.I. Acid Red 52") is usually used. This dye can form a good magenta color, but, when present in ink compositions, may cause a great change in pH as a result of long-term storage, resulting in a poor liquid stability.

SUMMARY OF THE INVENTION

The present invention was made in order to solve the above problems. Accordingly, an object of the present invention is to provide a water-based magenta ink composition that enables recording with good color tones, has a superior liquid stability and may cause no clogging at nozzles and in ink channels of the head of a recording apparatus.

To achieve the above object, the present invention provides a water-based magenta ink composition comprising an aqueous medium, a magenta dye dissolved therein and a pH adjuster; wherein the magenta dye is Color Index Number Acid Red 52, the pH adjuster is a basic organic compound, and the pH of the water-based magenta composition is adjusted to a value within the range of from 8 to 10.

The present invention also provides an ink-jet recording process comprising jetting an ink composition to a recording medium in the form of droplets to make a record, wherein;
the ink composition comprises a water-based magenta ink composition comprising an aqueous medium, a magenta dye dissolved therein and a pH adjuster; wherein the magenta dye is Color Index Number Acid Red 52, the pH adjuster is a basic organic compound, and the pH of the water-based magenta composition is adjusted to a value within the range of from 8 to 10.

These and other objects, features and benefits of the present invention are described in or will become apparent from the following detailed description of the invention.

DETAILED DESCRIPTION OF THE INVENTION

The water-based magenta ink composition of the present invention comprises an aqueous medium, a magenta dye dissolved therein and a pH adjuster. As the magenta dye, Color Index Number Acid Red 52 is used. As the pH adjuster, a basic organic compound is used, and the pH of the water-based magenta composition is adjusted to a value within the range of from 8 to 10.

The water-based magenta ink used in the present invention is a water-soluble acid dye C.I. Acid Red 52. When this C.I. Acid Red 52 is used, recorded images can have a clearer hue than when other acid dyes and direct dyes are used, and also can have a good color tone as magenta.

The C.I. Acid Red 52 may preferably be contained in an amount of from 0.1 to 5% by weight based on the total weight of the magenta ink to be obtained. Water-soluble dyes are commonly used in conventional ink compositions in such a proportion that they hold about 0.1 to 10% by weight. In the present invention, however, sufficient color density and sharpness of recorded images can be achieved even when the ink composition is used in the amount described above.

The aqueous medium (a solvent) used in the present invention is water, or a mixed solvent of water and a water-soluble organic solvent. As the water, it is preferable to use not commonly available water containing various ions, but deionized water.

The water-soluble organic solvent may be contained in the water-based magenta ink composition in an amount of usually from 0 to 95% by weight, preferably from 10 to 80% by weight, and more preferably from 10 to 50% by weight, based on the total weight of the water-based magenta ink composition. When this water-soluble organic solvent is used, the content of the water may be determined within a vast range, depending on the type of the water-soluble organic solvent, the composition thereof and the desired properties of the water-based magenta ink composition, and may be within the range of usually from 10 to 95% by weight, preferably from 10 to 70% by weight, and more preferably from 20 to 70% by weight, based on the total weight of the ink composition.

There are no particular limitations on the above water-soluble organic solvent. It may include, e.g., lower alcohols such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones such as acetone; ketoalcohols such as diacetone alcohol; ethers such as tetrahydrofuran and dioxane; polyalkylene glycols such as polyethylene glycol and polypropylene glycol; alkylene glycols such as ethylene glycol, propylene glycol, butylene glycol, diethylene glycol, triethylene glycol, dipropylene glycol, tripropylene glycol, thiodiglycol and hexylene glycol; lower alkyl ethers of polyhydric alcohols, such as ethylene glycol monomethyl ether, ethylene glycol monoethyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; glycerol; 2-pyrrolidone; N-methyl-2-pyrrolidone; and 1,3-dimethyl-2-imidazolidinone.

The pH adjuster used in the present invention is a basic organic compound. The basic organic compound may preferably include tris(hydroxymethyl)aminomethane, triethanolamine and 2-aminomethyl-1,3-propanediol. This basic organic compound, different from other inorganic salts commonly used as pH adjusters, does not solidify in itself at the nozzles of the ink-jet printer head, and exhibits a superior effect of hardly causing clogging. The amount of the component in the basic organic compound may be appropriately determined depending on the desired pH value.

The water-based magenta ink composition of the present invention has a pH of from 8 to 10. If its pH is lower than 8, the dye tends to become deposited when the water-based magenta ink composition is stored for a long period, to cause clogging at nozzles and in ink channels of the ink-jet printer head. If the pH is higher than 10, the ink may cause deformation of members used in the ink-jet recording apparatus, in particular, members in which organic materials are used, or the organic materials may dissolve into the water-based magenta ink composition. Also, since the ink is strongly alkaline, it may be harmful to human bodies. Hence, the pH is limited to the above range.

To the water-based magenta ink composition of the present invention, various conventionally known additives may be optionally added, as exemplified by a variety of cationic, anionic or nonionic surface active agents, viscosity modifiers such as polyvinyl alcohol, celluloses and water-soluble resins, surface tension modifiers, and antifungal agents. When an ink composition is prepared which is used in an ink-jet recording process of the type a recording solution is electrically charged, a specific resistance modifier including inorganic salts such as ammonium chloride may be added.

The water-based ink composition of the present invention can be produced by any conventional methods. For example, the magenta dye, the aqueous medium and the pH adjuster are thoroughly mixed with stirring, followed by filtering.

The water-based magenta ink composition of the present invention, obtained in the manner as described above, has well solved the problems involved in the prior art, and for itself has well balanced performances in respect of recording performances in ink-jet recording (e.g., signal response, stability in droplet formation, ejection stability, long-time continuous recording performance, and ink ejection stability after long-time pause), storage stability, fixing performance to recording mediums, recorded image light-fastness, water resistance and so forth, and can be useful as ink compositions for ink-jet recording of various systems. Hence, an ink-jet recording process carried out using the water-based magenta ink composition of the present invention by jetting it to a recording medium (e.g., plain paper, coated paper, transparent film) in the form of droplets to make a record is embraced in the present invention. In particular, the ink-jet recording process of the present invention can be preferably applied in the ink-jet recording system in which the water-based ink composition is jetted in the form of droplets by utilizing the vibration of a piezoelectric device and also in the ink-jet recording system in which the water-based ink composition is jetted in the form of droplets by utilizing the action of heat energy, the latter being easily affected by the formation of deposits. Thus, the process does not cause clogging at nozzles and in ink channels of the head of the recording apparatus, does not damage the members used in the ink-jet recording apparatus, in particular, the members comprised of organic materials, and also can form good recorded images.

EXAMPLES

The present invention will be described below in greater detail by giving Examples and Comparative Examples. The present invention is by no means limited to the following Examples.

Example 1

To 77.92 parts by weight of pure water, 0.08 part by weight of tris(hydroxymethyl)aminomethane, 2 parts by weight of C.I. Acid Red 52 and 20 parts by weight of ethylene glycol were added, and the mixture was stirred for 30 minutes, followed by filtration with a membrane filter of 0.7 μm in pore diameter to obtain a magenta ink composition. The pH of this magenta ink composition was measured to find that it was 9.25.

This magenta ink composition was examined on the following T1 to T8, and good results were obtained in all items.

(T1) Long-term stability: The ink composition was hermetically enclosed in a heat-resistant glass bottle, and stored at −30° C. or 60° C. for 6 months. Even after such storage, deposition of insoluble matter was not seen, and changes in color tone were little seen. With regard to changes in liquid properties, the pH was 9.11 after the storage at −30° C. and a little lowered to 8.95 at 60° C., but changes in viscosity, surface tension, conductivity, density and so forth were little seen.

(T2) Ejection stability, color forming performance: Using the shear mode type ink-jet recording head disclosed in Japanese Patent Application Laid-open No. 2-150355, the ink composition was continuously ejected in an atmosphere of 5° C., 20° C. or 40° C., for 24 hours for each. Always stable, high-quality recording was performed in all atmospheres. Also, the recorded images obtained were clear and had a good magenta color tone.

(T3) Ejection response: Using the shear mode type ink-jet recording head disclosed in Japanese Patent Application Laid-open No. 2-150355, intermittent ejection at intervals of 1 minute and ejection after leaving for 2 months were examined. In both instances, no clogging occurred at the nozzles or ink channels of the ink-jet printer head, and stable and uniform recording was performed.

Example 2

To 77.96 parts by weight of pure water, 0.04 part by weight of tris(hydroxymethyl)aminomethane, 2 parts by weight of C.I. Acid Red 52 and 20 parts by weight of ethylene glycol were added, and a magenta ink composition was obtained in the same manner as in Example 1. The pH of this magenta ink composition was measured to find that it was 8.50.

The magenta ink composition obtained was examined in the same manner as in Example 1, and the same good results as in Example 1 were obtained. In the evaluation of long-term stability in T1, the pH was 8.40 after the storage at −30° C. and 8.35 at 60° C.

Example 3

To 78.4 parts by weight of pure water, 0.1 part by weight of triethanolamine, 1.5 parts by weight of C.I. Acid Red 52 and 20 parts by weight of ethylene glycol were added, and a magenta ink composition was obtained in the same manner as in Example 1. The pH of this magenta ink composition was measured to find that it was 9.00.

The magenta ink composition obtained was examined in the same manner as in Example 1, and the same good results as in Example 1 were obtained. In the evaluation of long-term stability in T1, the pH was 8.98 after the storage at −30° C. and 8.70 at 60° C.

Example 4

To 78.45 parts by weight of pure water, 0.05 part by weight of triethanolamine, 1.5 parts by weight of C.I. Acid Red 52 and 20 parts by weight of ethylene glycol were added, and a magenta ink composition was obtained in the same manner as in Example 1. The pH of this magenta ink composition was measured to find that it was 8.20.

The magenta ink composition obtained was examined in the same manner as in Example 1, and the same good results as in Example 1 were obtained. In the evaluation of long-term stability in T1, the pH was 8.18 after the storage at −30° C. and 8.03 at 60° C.

Example 5

To 76.93 parts by weight of pure water, 0.07 part by weight of 2-aminomethyl-1,3-propanediol, 3 parts by weight of C.I. Acid Red 52 and 20 parts by weight of ethylene glycol were added, and a magenta ink composition was obtained in the same manner as in Example 1. The pH of this magenta ink composition was measured to find that it was 9.85.

The magenta ink composition obtained was examined in the same manner as in Example 1, and the same good results as in Example 1 were obtained. In the evaluation of long-term stability in T1, the pH was 9.70 after the storage at −30° C. and 9.35 at 60° C.

Example 6

To 76.99 parts by weight of pure water, 0.01 part by weight of 2-aminomethyl-1,3-propanediol, 3 parts by weight of C.I. Acid Red 52 and 20 parts by weight of ethylene glycol were added, and a magenta ink composition was obtained in the same manner as in Example 1. The pH of this magenta ink composition was measured to find that it was 8.86.

The magenta ink composition obtained was examined in the same manner as in Example 1, and the same good results as in Example 1 were obtained. In the evaluation of long-term stability in T1, the pH was 8.82 after the storage at −30° C. and 8.56 at 60° C.

Comparative Example 1

To 77.98 parts by weight of pure water, 0.02 part by weight of tris(hydroxymethyl)aminomethane, 2 parts by weight of C.I. Acid Red 52 and 20 parts by weight of ethylene glycol were added, and a magenta ink composition was obtained in the same manner as in Example 1. The pH of this magenta ink composition was measured to find that it was 7.70.

The magenta ink composition obtained was examined in the same manner as in Example 1. As a result, in T1, the pH was 7.60 after the storage at −30° C. and 7.03. at 60° C., and deposition of solid matter was seen in both instances. In respect of T3, the ink often did not ejected. The head nozzles of the ink-jet printer were observed using an optical microscope to confirm that solid matter was seen to have adhered.

Comparative Example 2

The procedure of Example 1 was repeated to produce a water-based magenta ink composition, except that the tris (hydroxymethyl)aminomethane was not added. As a result, the pH of the ink composition was 5.15.

This magenta ink composition was examined in the same manner as in Example 1. As a result, in T1, the pH was 5.10 after the storage at −30° C. and 4.76 at 60° C., and deposition of solid matter was seen in both instances. In respect of Ta and T3, the ink often did not ejected. The head nozzles of the ink-jet printer were observed using an optical microscope to confirm that solid matter was seen to have adhered.

Comparative Example 3

To 78 parts by weight of an aqueous KOH solution prepared so as to have a concentration of $2\times10^{-5}$ mol/lit., 2 parts by weight of C.I. Acid Red 52 and 20 parts by weight of ethylene glycol were added, and a magenta ink composition was obtained in the same manner as in Example 1. The pH of this magenta ink composition was measured to find that it was 8.93.

The magenta ink composition obtained was examined in the same manner as in Example 1. As a result, in T1, the pH was 7.85 after the storage at −30° C. and 7.21 at 60° C., and deposition of solid matter was seen in both instances. In respect of T2 and T3, the ink often did not ejected. The head nozzles of the ink-jet printer were observed using an optical microscope to confirm that solid matter was seen to have adhered.

Comparative Example 4

To 54 parts by weight of pure water, 0.3 part by weight of sodium tetraborate, 21 parts by weight of a 0.12N aqueous HCl solution, 2 parts by weight of C.I. Acid Red 52 and 20 parts by weight of ethylene glycol were added, and a magenta ink composition was obtained in the same manner as in Example 1. The pH of this magenta ink composition was measured to find that it was 8.70.

The magenta ink composition obtained was examined in the same manner as in Example 1. As a result, in T1, the pH was 8.68 after the storage at −30° C. and 8.65 at 60° C., bur deposition of solid matter was seen after the storage at 60° C. In respect of T2 and T3, the ink often did not ejected. The head nozzles of the ink-jet printer were observed using an optical microscope to confirm that solid matter was seen to have adhered.

Comparative Example 5

To 77.53 parts by weight of pure water, 0.02 part by weight of potassium dihydrogenphosphate, 0.45 part by weight of disodium hydrogenphosphate, 2 parts by weight of C.I. Acid Red 52 and 20 parts by weight of ethylene glycol were added, and a magenta ink composition was obtained in the same manner as in Example 1. The pH of this magenta ink composition was measured to find that it was 8.15.

The magenta ink composition obtained was examined in the same manner as in Example 1. As a result, in T1, the pH was 8.13 after the storage at −30° C. and 7.89 at 60° C., and deposition of solid matter was seen after the storage at 60° C. In respect of T2 and T3, the ink often did not ejected. The head nozzles of the ink-jet printer were observed using an optical microscope to confirm that solid matter was seen to have adhered.

Comparative Example 6

To 77.51 parts by weight of pure water, 0.45 part by weight of ammonium chloride, 0.04 part by weight of a 0.1N ammonia water, 2 parts by weight of C.I. Acid Red 52 and 20 parts by weight of ethylene glycol were added, and a magenta ink composition was obtained in the same manner as in Example 1. The pH of this magenta ink composition was measured to find that it was 8.86.

The magenta ink composition obtained was examined in the same manner as in Example 1. As a result, in T1, the pH was 8.78 after the storage at −30° C. and 8.71 at 60° C. However, deposition of solid matter was seen after the storage at 60° C. In respect of T2 and T3, the ink often did not ejected. The head nozzles of the ink-jet recording apparatus were observed using an optical microscope to confirm that solid matter was seen to have adhered.

Comparative Example 7

To 77.18 parts by weight of pure water, 0.06 part by weight of sodium carbonate, 0.76 part by weight of sodium hydrogencarbonate, 2 parts by weight of C.I. Acid Red 52 and 20 parts by weight of ethylene glycol were added, and a magenta ink composition was obtained in the same manner as in Example 1. The pH of this magenta ink composition was measured to find that it was 8.89.

The magenta ink composition obtained was examined in the same manner as in Example 1. As a result, in T1, the pH was 8.88 after the storage at −30° C. and 8.85 at 60° C. However, deposition of solid matter was seen and a color change was also seen after the storage at 60° C. In respect of T2 and T3, the ink often did not ejected. The head nozzles of the ink-jet recording apparatus were observed using an optical microscope to confirm that solid matter was seen to have adhered.

In the magenta ink compositions of Examples 1 to 6, which showed good long-term storage stability, ejection stability and color forming performance, and also a good ejection response, the ink composition contained C.I. Acid Red 52 as the dye, the basic organic compound as the pH adjuster and its pH was adjusted to 8 to 10 in all the cases.

On the other hand, in the magenta ink compositions of Comparative Examples 1 to 7, which showed inferior long-term storage stability, ejection stability, color forming performance and ejection response, the ink composition did not fulfill the above conditions in all the cases.

Using the magenta ink compositions of Examples 1 to 6 as magenta inks, full-color recording was performed. As a result, well color-balanced and clear recorded images were obtained.

What is claimed is:

1. A water-based magenta ink composition comprising an aqueous medium, a magenta dye dissolved therein and a pH adjuster;

wherein said magenta dye is Color Index Number Acid Red 52, said pH adjuster is a basic organic compound, and the pH of the ink composition is within the range of from 8 to 10, said basic organic compound being used in an amount necessary to adjust the pH of the ink composition within the range of from 8 to 10.

2. The water-based magenta ink composition according to claim 1, wherein said Color Index Number Acid Red 52 is contained in an amount of from 0.1% by weight to 5% by weight based on the total weight of the water-based magenta ink composition.

3. The water-based magenta ink composition according to claim 1, wherein said pH adjuster is selected from the group consisting of tris(hydroxymethyl)-aminomethane, triethanolamine and 2-aminomethyl-1,3-propanediol.

4. The water-based magenta ink composition according to claim 1, wherein said aqueous medium is a mixed solvent of water and a water-soluble organic solvent.

5. The water-based magenta ink composition according to claim 4, wherein said water is deionized water.

6. The water-based magenta ink composition according to claim 5, wherein said water is contained in an amount of from 10% by weight to 70% by weight based on the total weight of the water-based magenta ink composition.

7. An ink-jet recording process comprising jetting an ink composition to a recording medium in the form of droplets to make a record, wherein;

said ink composition comprises a water-based magenta ink composition comprising an aqueous medium, a magenta dye dissolved therein and a pH adjuster; wherein said magenta dye is Color Index Number Acid Red 52, said pH adjuster is a basic organic compound, and the pH of the water-based magenta composition is adjusted to a value within the range of from 8 to 10.

8. The ink-jet recording process according to claim 7, wherein said ink composition is jetted in the form of droplets by utilizing the vibration of a piezoelectric device.

9. The ink-jet recording process according to claim 7, wherein said ink composition is jetted in the form of droplets by the action of heat energy.

* * * * *